Figure 1:
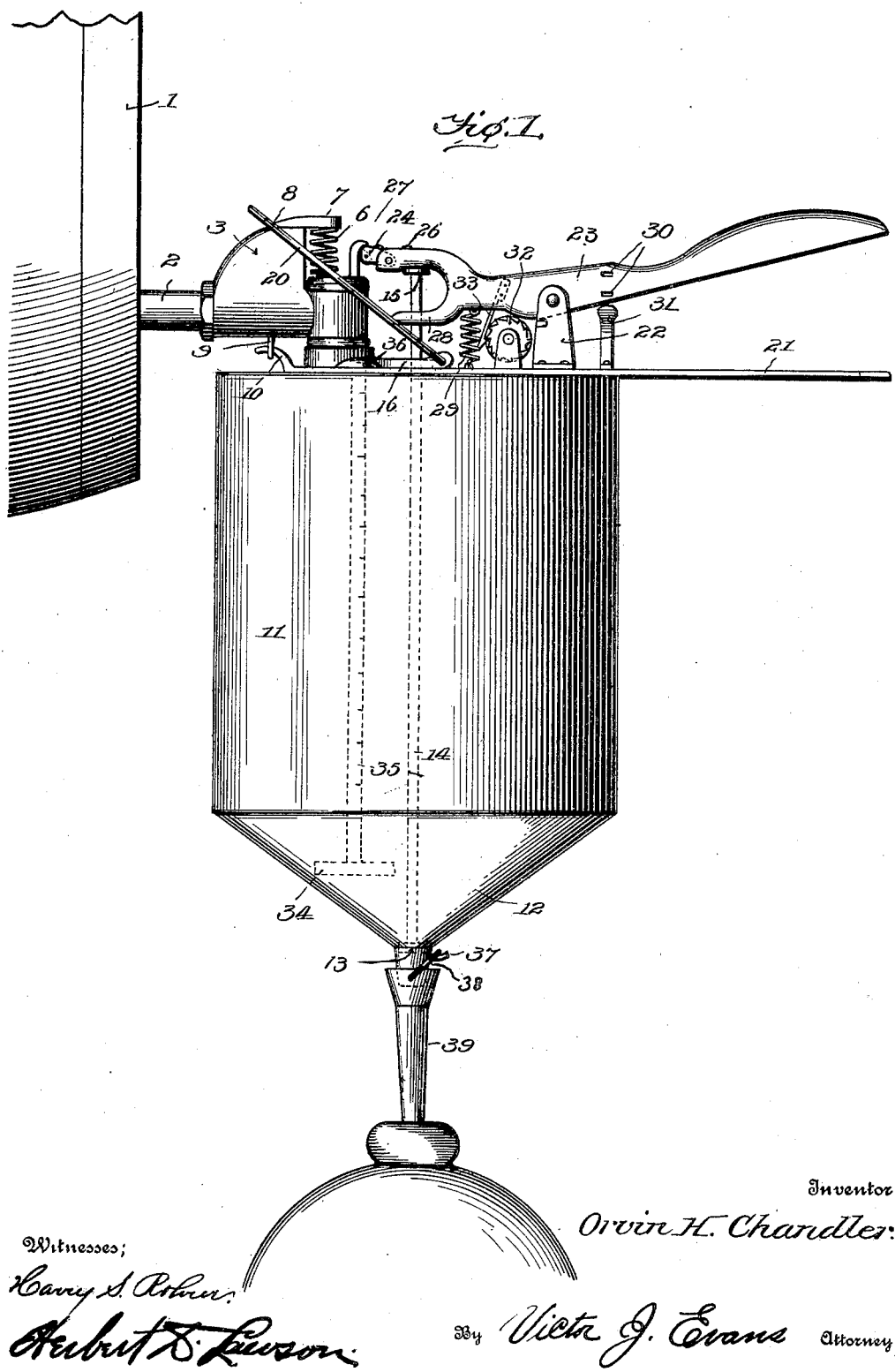

No. 679,295. Patented July 30, 1901.
O. H. CHANDLER.
MEASURING FAUCET.
(Application filed Dec. 5, 1900.)
(No Model.) 2 Sheets—Sheet 1.

Witnesses:
Inventor:
Orvin H. Chandler
By Victor J. Evans, Attorney

No. 679,295. Patented July 30, 1901.
O. H. CHANDLER.
MEASURING FAUCET.
(Application filed Dec. 5, 1900.)
(No Model.)
2 Sheets—Sheet 2.
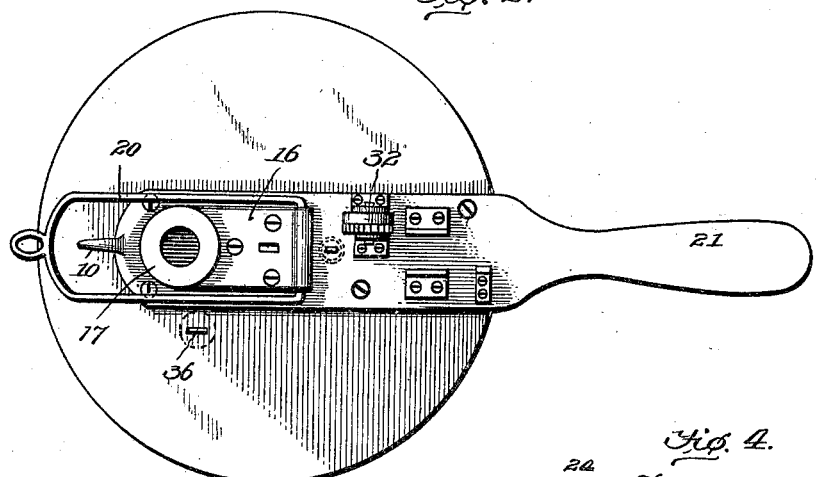
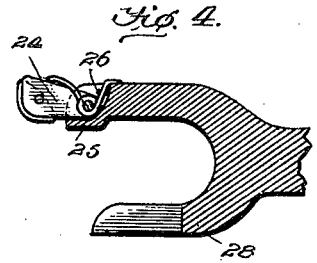
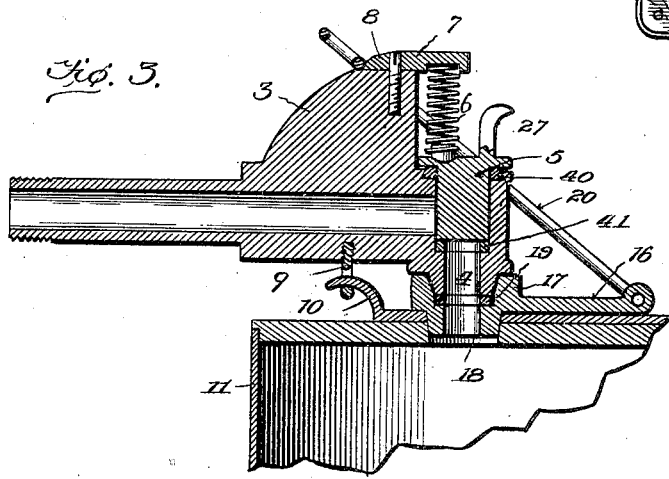
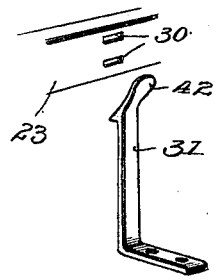
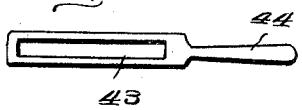
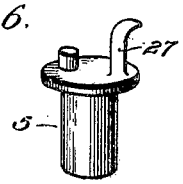
Witnesses:
Harry S. Rohrer,
Herbert D. Lawson.
Inventor:
Orvin H. Chandler:
By Victor J. Evans. Attorney
THE NORRIS PETERS CO., PHOTO-LITHO., WASHINGTON, D. C.

UNITED STATES PATENT OFFICE.

ORVIN H. CHANDLER, OF CLINTON, SOUTH CAROLINA.

MEASURING-FAUCET.

SPECIFICATION forming part of Letters Patent No. 679,295, dated July 30, 1901.

Application filed December 5, 1900. Serial No. 38,786. (No model.)

*To all whom it may concern:*

Be it known that I, ORVIN H. CHANDLER, a citizen of the United States, residing at Clinton, in the county of Laurens and State of South Carolina, have invented new and useful Improvements in Measuring-Faucets, of which the following is a specification.

This invention relates to new and useful improvements in measuring-faucets; and its primary object is to provide a device which may be readily attached to a barrel or other liquid-containing receptacle and which is adapted to measure the liquid as the same is drawn therefrom.

A further object is to provide a lever whereby the supply of liquid to the measure may be controlled, the said lever being also adapted to open the outlet from the measure when the desired amount of liquid has been discharged thereinto. Means are also provided for indicating the quantity of liquid within the measure, and a suitable register operated by the lever before referred to is provided for recording the number of times the measure is filled and emptied.

With these and other objects in view the invention consists in providing a faucet having a vertically-movable plug therein adapted when in normal position to prevent the discharge of liquid from the receptacle to which the faucet is attached. This plug is normally held in closed position in any suitable manner and is provided with a hooked stem which is adapted to be engaged by a dog pivoted to the end of a lever which is mounted upon a measure of peculiar construction. This measure is detachably secured to the faucet and is provided with an inlet adapted to be placed in alinement with the outlet of the faucet. The lever before referred to is provided at a point below the dog with a forked arm adapted to engage the upper end of a rod extending downward through the measure to the outlet thereof, the lower end of this rod having a plug which normally closes the outlet. A register of any desired form is mounted upon the measure and is operated from the lever. A float is located within the measure, and a stem extends upward therefrom through an aperture, and this stem is provided with suitable graduations, whereby the amount of liquid within the measure may be readily determined.

The invention also consists in providing means whereby the lever may be securely locked in position both when the same is holding the plug in open position and after said plug has been released and the rod and its plug within the measure raised.

The invention also consists in certain novel features of construction and combination of parts, which will be hereinafter fully described and claimed, and illustrated in the accompanying drawings, showing the preferred form of my invention, and in which—

Figure 1 is an elevation of the device, showing the same in position for use. Fig. 2 is a top plan view of the measure detached and with the lever removed therefrom. Fig. 3 is a section through the faucet and a portion of the measure. Fig. 4 is a section through one end of the lever. Fig. 5 is a detail view of a portion of the lever and the locking means therefor. Fig. 6 is a similar view of the faucet-plug. Fig. 7 is a detail view of a sampling-key.

In the drawings the same reference characters indicate the same parts of the invention.

1 is a receptacle of any suitable form containing the liquid to be drawn and measured. This receptacle is provided with a faucet 2, preferably formed of a tube, which is detachably secured therein. A head 3 is provided at the outer end of this tube, and a passage 4, arranged at right angles to the passage within the tube 2, is formed within the head and adapted to receive a sliding plug 5. This plug is held normally projected into the passage 4 by means of a coil-spring 6, one end of which bears upon said plug, while the opposite end contacts with a plate 7, secured to the top of the head 3 in any suitable manner. The rear edge of this plate 7 forms a shoulder 8, and an eye or loop 9 is arranged at the bottom of the head. This loop is adapted to receive a hook 10, extending from the top of a casing 11, forming the measure. This casing is preferably cylindrical, and the bottom 12 thereof is tapered toward the center and provided with an outlet, which is normally closed by means of a plug 13, secured at the lower end of a rod 14. This rod extends upward through the top of the casing and is provided at its outer end with a head 15. A plate 16 is secured to the top of the measure 11 and is provided with a flange 17, inclosing an aperture 18 therein, which extends through the top of the casing. This aperture is adapted to receive the lower end of the faucet 2, and washers, as 19, may be provided, whereby a tight joint is secured.

A loop 20 is hinged to the plate 16 and is adapted to swing over the plate 7, secured upon the head 3, and is held in position by means of the shoulder 8, formed by the plate 7. It will be seen that by means of this loop and the hook 10, before referred to, the measure may be readily secured to the faucet.

A handle 21 extends laterally from the top of the casing 11, and by means thereof the measure may be readily carried from place to place.

Standards 22 are secured upon the casing, and mounted therebetween is a lever 23, within the forward end of which is pivotally mounted a dog 24, which dog is prevented from swinging downward by means of a shoulder 25, formed with the lever, and a spring 26 serves to hold the dog normally in contact with said shoulder. The dog is permitted to swing in a vertical plane by the spring 26, and it is obvious that said spring will return the same to normal position when pressure is removed therefrom. This dog is adapted to engage the hooked end of a stem 27, which extends upward from the plug 5, before referred to. A fork 28 extends from the end of the lever at a point below the dog 24, and this fork extends upon opposite sides of the rod 14, before referred to, at a point below the head 15 thereof.

A coil-spring 29 is connected at opposite ends to the lever 23 and to the top of the measure and serves to hold the inner end of the lever normally depressed. Apertures or recesses 30 are formed within the side of the lever 23 and are adapted to receive the head of a spring-catch 31, secured to the top of the measure. A register 32, of any desired form, is mounted upon the top of the measure and is operated by means of a spring-catch 33, secured to the lever. This register is adapted to record the number of times the measure is filled and emptied. A float 34, formed of cork or other suitable material, is located within the measure, and a graduated stem 35 extends upward therefrom through an aperture within the top of the measure. This aperture serves the purpose of an air-outlet, and the head 36 of the stem is adapted when the measure is emptied to close the aperture and prevent the admission of dust, &c., to the measure.

A hook 37 extends from the measure at a point adjacent to the outlet and is adapted to engage a bail 38 or other device secured to the top of a funnel 39.

When it is desired to fill the measure, the lever 23 is pressed downward. This will cause the dog 24 to press the hooked stem 27 upward, carrying the plug 5 therewith. When the plug has reached the limit of its movement, the spring-catch 31 will engage the lower recess 30 within the lever and lock the same in the position to which it has moved. As soon as the plug is slid upward by the lever the liquid will be free to flow downward into the measure, and as the same fills the float 34 will be raised thereby, causing the stem to slide upward through the aperture. The graduations upon the stem 35 will indicate the amount of liquid within the receptacle. When the desired quantity has been discharged into the measure, the lever is again pressed upward, causing the dog to escape the end of the hook upon the stem 27, and as the plug 5 returns to its normal position the forked end 28 of the lever engages the head 15 of the rod 14 and raises the same, causing the plug 13 to move out of the outlet of the measure. The liquid will then flow downward through the funnel 39 into any receptacle which may be located beneath the same. When the lever is moved to this position, the catch 31 will be pressed outward and will engage the upper recess 30 therein, holding the lever in such position. It will also be seen that when the lever is depressed the register 32 will be moved by the catch 33. After the liquid has been discharged from the measure the catch 31 is released from engagement with the lever and the spring 29 will immediately return the same to normal position, the dog 24 slipping over the hooked end of the stem 27 and returning to the position shown in Fig. 1. As the liquid discharges it will of course be obvious that the float 34 moves downward therewith until the cap 36 thereof bears upon the top of the measure. This cap serves to prevent the admission of dust to the measure when the same is emptied.

When it is desired to detach the measure from the faucet, it is merely necessary to swing the loop 20 outward out of engagement with the shoulder 8, and the hook 10 can then be removed from the eye 9. Where several receptacles are provided with faucets such as herein described, it is obvious that one measuring device may be employed for all of the faucets, as the same may be readily attached to or detached from any one of them.

By providing a cylindrical plug 5 the liquid will not overflow when said plug is raised. Washers 40 and 41 are arranged within the passage 4, and one of them, 40, is adapted to be contacted by the head of the plug 5 when seated, while the washer 41 is at the same time contacted by the lower end of said plug. These washers, together with the washer 19, serve to prevent leakage during the operation of the faucet.

The catch 31 is preferably provided with a head 42, whereby the same may be readily forced away out of engagement with lever 23.

In Fig. 7 I have shown a form of key for use in sampling the liquid before the measure is placed in position. This key is operated by placing its loop 43 into engagement with the shoulder 8 and the hook 27. The plug 5 may then be raised by forcing the handle 44 upward. Liquid will then flow from the passage 4 of the faucet, and if found to be of the desired character the measure is attached as hereinbefore described.

Having thus described the invention, what is claimed, and desired to be secured by Letters Patent, is—

1. The combination with a faucet; of a sliding plug therein; means for holding the plug normally in closed position; a measure detachably secured to the faucet and communicating with the interior thereof; an outlet from the measure; a plug therein; a lever fulcrumed upon the measure and adapted to engage the plug in the faucet; and means for operating the plug in the measure from said lever, said lever being adapted to raise the plugs alternately.

2. The combination with a faucet; of a sliding plug therein, means for holding the plug normally in closed position, a hooked stem to the plug, a measure detachably secured to the faucet and communicating with the interior thereof, an outlet from the measure, a plug within the outlet, a rod extending from said plug and through the top of the measure, a lever fulcrumed upon the measure, a dog pivoted in one end of the lever and adapted to engage the hooked stem, and a fork extending from the lever and inclosing the rod, said lever adapted to raise the plugs alternately.

3. The combination with a faucet; of a sliding plug therein, a spring for holding the plug normally in closed position, a hooked stem extending from the plug, a measure communicating with the interior of the faucet, an outlet from the measure, a plug within the outlet, a rod extending therefrom and through the top of the measure, a lever fulcrumed upon the measure, a dog pivoted in one end of the lever and adapted to engage the hooked stem, a fork to said lever engaging the rod, said lever being adapted to raise and release the plugs alternately, and means for holding the forked end of the lever normally depressed.

4. The combination with a faucet having longitudinally and transversely extending communicating passages; of a sliding plug within the transverse passage, a spring for holding the plug normally in closed position, a hooked stem to said plug, a measure detachably secured to the faucet and communicating with the transverse passage, an outlet from said measure, a plug therein, a stem extending from the plug and through the top of the measure, a lever fulcrumed upon the measure, the end thereof engaging the hooked stem, a fork to the lever engaging the rod, said lever adapted to raise and release the plugs alternately, a float within the measure, a graduated stem extending therefrom through the top of the measure, and a cap to the stem adapted to bear upon the top of the measure.

5. The combination with a faucet having longitudinally and transversely extending communicating passages; of a sliding plug within the transverse passage, means for holding the plug normally in closed position, a hooked stem to the plug, a measure detachably secured to the faucet and communicating with the transverse passage, an outlet to the measure, a plug therein, a rod extending from the plug through the top of the measure, a lever fulcrumed upon the measure, a dog pivoted within the end thereof and when raised, adapted to engage the stem, a fork to the lever adapted when raised to engage the rod, said plugs being lifted and released alternately by the lever, means for returning the forked end of the lever to normal position, means for locking the lever when either of the plugs is in raised position, a register, a catch secured to the lever and adapted to operate the register, a float, a graduated stem extending therefrom and through the top of the measure, and a cap to the stem adapted to bear upon said top.

6. The combination with a faucet having longitudinally and transversely extending communicating passages; of a plug slidably mounted within the transverse passage, means for holding the plug in normally closed position, a stem to the plug, an eye extending from the faucet, a measure communicating with the transverse passage, a hook thereon engaging the eye, a loop hinged to the measure and extending over and engaging the end of the faucet, an outlet to the measure, a plug therein, a rod extending from the plug and through the top of the measure, a lever fulcrumed upon the measure and engaging the stem and rod and adapted to raise and release the same alternately, a float within the measure, a graduated stem extending therefrom through the top of the measure, a hook adjacent to the outlet of the measure, a funnel, and a bail thereto engaging the hook.

In testimony whereof I affix my signature in presence of two witnesses.

ORVIN H. CHANDLER.

Witnesses:
W. E. OWENS,
W. A. MARTIN.